United States Patent [19]

Whitehead

[11] 4,267,283

[45] May 12, 1981

[54] STYRENIC IMPACT POLYMERS

[75] Inventor: Richard O. Whitehead, Houston, Tex.

[73] Assignee: Shell Oil Company, Houston, Tex.

[21] Appl. No.: 159,712

[22] Filed: Jun. 16, 1980

[51] Int. Cl.$^3$ .............................................. C08L 53/00
[52] U.S. Cl. ..................................................... 525/89
[58] Field of Search ........................................ 525/89

[56] References Cited

U.S. PATENT DOCUMENTS

| | | |
|---|---|---|
| 3,485,894 | 12/1969 | Porter .................................... 525/95 |
| 3,868,434 | 2/1975 | Westphal et al. ..................... 525/199 |
| 3,929,936 | 12/1975 | Davis et al. .......................... 525/199 |
| 3,976,721 | 8/1976 | Satake et al. ......................... 525/199 |
| 4,026,969 | 5/1977 | Mostert ................................. 525/199 |
| 4,096,205 | 6/1978 | Reith .................................... 525/199 |

*Primary Examiner*—J. Ziegler
*Attorney, Agent, or Firm*—Dean F. Vance

[57] ABSTRACT

Vinyl aromatic compositions having improved impact and toughness are disclosed comprising interpolymers containing a mixture of a certain tapered S'B'S' copolymer and a certain SBS block copolymer with a poly(-monovinyl aromatic) compound.

12 Claims, No Drawings

STYRENIC IMPACT POLYMERS

BACKGROUND OF THE INVENTION

It has long been known that the brittle nature of poly(monovinylaromatic) polymers such as polystyrene is overcome by incorporating a minor amount of rubber. The rubber is largely incompatible with the polymeric vinyl compounds resulting in a two-phase system comprising a dispersed rubbery phase and a poly(monovinylaromatic) matrix.

One of the major variables in the preparation of such impact improved polymers is the selection of the particular rubber to be employed. Among the various rubbers mentioned in the patent literature are:

| | |
|---|---|
| medium cis polybutadiene | U.S. 3,868,434 |
| styrene-butadiene-block copolymers | U.S. 3,485,894 |
| styrene-butadiene random copolymers | U.S. 3,976,721 |
| lithium-initiated styrene-butadiene copolymers | U.S. 3,929,936 |
| low styrene content styrene-butadiene copolymers | U.S. 4,096,205 |
| Blends of polybutadiene rubber and polyisoprene rubber | U.S. 4,026,969 |

Numerous other patents claiming advantages for certain rubbers or blends of rubbers are also known.

A novel rubber composition for use in making impact improved polymers has now been found. This rubber composition results in significantly improved impact properties, along with an unobvious morphological structure.

SUMMARY OF THE INVENTION

There are two aspects to the present invention. One aspect deals with an improved impact polymer and the other aspect deals with the process to make the polymer. As for the first aspect, the invention contemplates a graft copolymer composition having improved toughness, said composition consisting essentially of:

(a) from about 8.0 to about 16.0 parts by weight of a mixture of an ABA block copolymer and an A'B'A' tapered copolymer in a weight ratio of ABA copolymer to A'B'A' copolymer of between about 25:75 and about 75:25 where each A segment is an essentially pure polymer block of styrene having a number average molecular weight of between about 14,000 and about 18,000, the B segment is an essentially pure polymer block of butadiene having a number average molecular weight of between about 60,000 and about 80,000, the B block having a glass transition temperature of about $-105°$ C.$\pm 5°$ C., the weight ratio of total A to B being between about 1:1.8 and about 1:2.7, and wherein each A' segment represents essentially polymerized styrene, the balance of the A' segment being polymerized butadiene, the B' segment represents essentially polymerized butadiene, the balance of the B' segment being polymerized styrene, the weight ratio of total A' to B' being from about 1:2.6 to about 1:3.6, the number average molecular weight of said A'B'A' block copolymers being between about 400,000 and about 660,000, and said B' block having a glass transition temperature of about $-90°$ C.$\pm 5°$ C.; and (b) from about 84 to about 92 parts by weight of a polymerized styrene.

The invention also contemplates an improved process for preparing an impact modified poly(vinyl aromatic) composition comprising bulk thermal polymerizing of from about 2 to about 25 parts of rubber dissolved in about 98 to about 75 parts of a feed in which the sole polymerizable monomer component consists essentially of one or more monovinyl aromatic compounds at a temperature in the range from about 90° to about 200° C., with agitation until the reaction mixture has undergone phase inversion, for a time sufficient to polymerize substantially all of the monovinyl aromatic compound and removing residual monomers to form an interpolymer containing discrete gelled rubber particles, which improvement comprises using as the rubber a mixture of the ABA block copolymer and the A'B'A' tapered copolymer described above in a weight ratio of ABA copolymer to A'B'A' copolymer of between about 25:75 and 75:25.

As shown in the following Illustrative Embodiments, polymers according to the present invention have significantly improved impact and toughness. Still further, the polymers according to the present invention have an unexpected and unobvious morphological structure. The dispersed phase morphology found in the polymers according to the present invention resembles closely packed polygons similar in appearance to the cells found in foamed polymeric compositions. This structure differs from the spherical cell morphology of conventional high impact polystyrene.

DETAILED DESCRIPTION OF THE INVENTION

The monovinyl aromatic compounds which can be employed in producing the rubber modified polymers according to the invention include monovinyl aromatic compounds having the vinyl radical i.e., the ethylenically unsaturated radical, attached directly to a carbon atom of the aromatic nucleus. Styrene is the preferred monovinyl aromatic compound. Examples of other compounds applicable herein are the alkyl and dialkyl derivatives of styrene such as dimethylstyrenes, ethylstyrenes, isopropylstyrenes, butyl-styrenes, etc.; the halogen derivatives of styrene, for example, chloro- and dichlorostyrene and the mono- and dibromostyrenes and alkylhalostyrenes as well as mixtures of these compounds with styrene or with each other. Alphamethylstyrene may be substituted in a minor amount, for example 2 to 30% by weight, preferably from about 5 to 25% in the total composition for a portion of the monovinylaromatic monomer to improve properties of the interpolymers such as heat distortion temperature. As used here and in the claims, the term "a polymerized styrene" includes the polymerized monovinyl aromatics described in this paragraph.

Broadly, the polymerized vinyl aromatic component comprises from about 92.0 to about 84.0% by weight of the final composition; in a more preferred aspect it comprises from about 91.0 to 88.0%.

The unvulcanized synthetic rubber materials used in preparing the interpolymer compositions according to the invention are an ABA block copolymer and an A'B'A' tapered copolymer.

The ABA block copolymer is a linear block copolymer where each A segment is a polymer block of a monovinyl aromatic and each B segment is a polymer block of butadiene. The preferred monovinyl aromatic for the A block is styrene. Methods for the preparation of such polymers are well known in the art. Particular reference is made to the use of lithium-based catalysts and especially lithium alkyls for the preparation of the polymers. See generally, U.S. Pat. Nos. 3,149,182; 3,231,635; 3,239,478; and 3,265,765. In general, there are two different mechanisms to form the polymer. In one method, the polymers result by sequential introduction of the desired monomer into the reaction vessel when using such initiators as lithium alkyls or dilithiostilbene and the like. In the other method, a difunctional coupling agent, such as dibromoethane is used to couple living two-segment block copolymers.

The average molecular weights of the individual blocks may vary within certain limits. In most instances, the A blocks will have number average molecular weights between about 14,000 and about 18,000, preferably between about 15,000 and about 17,000. The B blocks will have number average molecular weights between about 60,000 and about 80,000, preferably between about 65,000 and about 75,000. The total average molecular weight of the block copolymer is typically in the order of 88,000 to about 116,000. These molecular weights are most accurately measured by tritium counting methods or osmotic pressure methods.

The proportion of total mass of A blocks to B blocks is between about 1:1.8 and about 1:2.7, preferably about 1:2.2.

The tapered A'B'A' copolymers which are used herein are defined such that each A' represents essentially polymerized styrene and B' represents essentially polymerized butadiene. Tapered A'B'A' block copolymers differ from pure ABA block copolymers of the same molecular weight in that some of the A' monomer, generally about 20 weight percent of the total A' monomer, is included in the B' block while some of the B' monomer appears in the A' blocks. On the other hand, in the pure ABA block copolymers the A blocks are all of A monomer while the B block is all B monomer. One manifestation of this fact is the difference in glass transition temperatures between pure block copolymers and graded or tapered copolymers of essentially the same molecular weight. For styrene-butadiene-styrene block copolymers, the pure block copolymers generally show a glass transition temperature of about 105° C. for the polystyrene blocks A whereas the corresponding graded copolymers of this invention show a glass transition temperature of about −90° C. ±5° C. for the graded polybutadiene.

Each tapered A' segment has a number average molecular weight of between about 60,000 and about 80,000. The total number average molecular weight of the A'B'A' copolymer is between about 400,000 and about 600,000, preferably between about 400,000 and about 500,000. The weight ratio of total styrene to total butadiene present is between about 1:2.6 and about 1:3.6.

The preparation of tapered A'B'A; copolymers is disclosed in U.S. Pat. Nos. 3,287,333; 3,906,057 and 3,906,058.

Another critical aspect of the invention involves the relative amounts of A'B'A' tapered copolymer and ABA styrene-butadiene block copolymer employed. The range of weight ratios of ABA styrene-butadiene block copolymer to A'B'A' tapered copolymer is about 25:75 to about 75:25; preferably about 50:50.

The interpolymers according to the invention are prepared by mixing the A'B'A' tapered copolymer and ABA styrene-butadiene block copolymer with the vinyl aromatic monomer in the desired proportions and initiating the polymerization. Best results are obtained when the elastomers are dissolved with monomer prior to polymerization in a bulk polymerization process.

Antioxidants, chain regulators, lubricants, and fillers inert to the reaction can also be added. Examples of suitable antioxidants include 2,6-di-tert-butyl-4-methylphenol and trisnonylphenylphosphite, which may be added in amounts from about 0.1 to about 2% by weight of the total reaction mixture and preferably in amounts from about 0.25 to 1%. Light stabilizers such as 2-alkyl-2,3,4-benzotriazole may also be incorporated into the polymerization mass. Suitable chain transfer agents include sulfhydryl compounds, e.g., dodecyl-mercaptan and 2-mercaptoethanol. Preferred are alkyl mercaptans having from about 8 to about 20 carbon atoms per molecule or mixtures of these which can be added to the reaction mixture in amounts from about 0.0005 up to about 1% weight. The preferred concentration of mercaptan is from about 0.0015 to about 0.05 weight percent. The polymerization may be carried out in the presence of small amounts of other compounds which are known to be useful in preparing molding compositions. This includes low concentrations of lubricants or flow agents such as mineral oil of a viscosity in the range of about 100 to 500 SSU, paraffin wax, petrolatum, polybutenes and the like in concentrations up to about 10% by weight of the total mixture, preferably in amounts of about 1 to about 5 weight percent, for improving both the processing and molding characteristics of the polymer product.

While the polymerization is generally carried out in the absence of a catalyst, it may sometimes be desirable to add a catalyst of the free radical generating type. Suitable polymerization catalysts of this type are peroxides such as benzoyl peroxide, di-tert-butylperoxide, t-butyl peroxypivalate, diethyl-peroxy-carbonate, t-butyl peracetate and others well known in the art which are generally added in concentrations from about 0.01 to 0.2% by weight of the polymerized monomers. Coloring agents which are inert to the polymerization may also be added.

The mixture is then subjected to conditions which will cause the vinyl aromatic compound to polymerize with the mixed rubbers in a bulk process. Good results are obtained by heating the solution to a temperature of from about 90° to about 200° C. for a time sufficient to polymerize substantially all of the vinyl aromatic compound. The heating may be done with the addition of catalysts; the use of catalysts allows somewhat lower polymerization temperatures. Generally speaking, bulk polymerization for high impact compositions requires agitation for temperature control of the first polymerization stage and for proper dispersal of the rubbery material as it undergoes phase inversion, i.e., precipitates from the solution during this early polymerization step.

After the polymerization is complete the product may contain a small amount, e.g., about 1 to 2% of unpolymerized monovinyl aromatic compound. As the presence of monomer has an adverse affect on impact properties, this is preferably removed by any of the known methods for removing residual monomer. Such methods include, e.g., subjecting the interpolymer to vacuum, e.g., in a devolatilizing extruder.

The invention is further illustrated by reference to the following Illustrative Embodiments, which are given for the purpose of illustration only and are not meant to limit the invention to the particular reactants and conditions employed herein.

Illustrative Embodiment I

Six parts by weight of a medium cis-content polybutadiene homopolymer (designated "Diene 55") was dissolved in 94 parts by weight of styrene monomer and batch polymerized with stirring by heating to 125° C. until about 30 to 35% of the styrene was converted to polystyrene. This prepolymerizate was then converted to high impact polystyrene by heating it for 8–9 hours in a jar equipped with a reflux condenser in a sand bath. The sand bath temperature was programmed to increase at the rate of 10° C. per hour and to cut off and begin cooling at 200° C. All of the polymers were devolatilized by heating at 170°–180° C. on a two roll mill for 10 minutes. The materials were then ground into small pieces, compression molded, and cut or machined into specimens for various impact and toughness tests. The properties of the various resulting polymers are shown in Table 1. The resulting high impact polymers (not according to the present invention) are conventional high impact polystyrenes and constitute the base case to compare the advantages of the present invention.

TABLE 1

Interpolymers with Polybutadiene - Diene 55 ex Firestone

|  | V1 | V2 | V3 |
|---|---|---|---|
| Diene 55, % w | 6.0 | 6.0 | 6.0 |
| Viscosity, cp | 359 | 350 | 356 |
| Conversion (Prepoly.) % w | 35.0 | 30.5 | 29.0 |
| Dispersed Phase |  |  |  |
| Diene, % w | 6.3 | 6.1 | 6.5 |
| Gel, % w | 22.7 | 21.3 | 24.8 |
| Swell Index | 13.7 | 13.7 | 13.2 |
| Toughness (Comparison Molded) |  |  |  |
| Izod (Notched), ft-lb/in | 1.03 | 1.02 | 1.07 |
| Izod (Unnotched), ft-lb/in | 9.7 | 10.2 | 9.3 |
| Gardner, ft-lb/in | 29 | 24 | 21 |
| Toughness Index[a] | 10.5 | 10.0 | 9.5 |

[a]Toughness index is defined as (Izod (notched) × 10 + Izod (unnotched) + Gardner/2.5)/3.

ILLUSTRATIVE EMBODIMENT II

Polymerizations similar to those carried out in Illustrative Embodiment I were performed and the products recovered and tested. In these polymerizations two SBS block copolymers were used in place of the polybutadiene homopolymer. Block Copolymer I had a number average block molecular weight distribution of 16,000–69,000–16,000. Block Copolymer II had a number average molecular weight distribution of 114,000–772,000–114,000. The results are presented below in Table 2.

The properties of the product made with the high molecular weight triblock and the product made from the mixture of the high and low molecular weight triblock are similar to those of the products in Illustrative Embodiment I. The product made from the low molecular weight triblock failed to exhibit similar toughness.

TABLE 2

Interpolymers with Mixtures of High and Low Molecular Weight Triblock Polymers

| Block Copolymer I | $S/B/S \times 10^{-3}$ | 16/69/16 | | |
| Block Copolymer II | $S/B/S \times 10^{-3}$ | 114/772/114 | | |
| Run No. | | B45 | B47 | B129 |
|---|---|---|---|---|
| Percent by weight Block Copolymer I | | 0 | 5 | 10 |

TABLE 2-continued

Interpolymers with Mixtures of High and Low Molecular Weight Triblock Polymers

| Block Copolymer I | $S/B/S \times 10^{-3}$ | 16/69/16 | | |
| Block Copolymer II | $S/B/S \times 10^{-3}$ | 114/772/114 | | |
| Run No. | | B45 | B47 | B129 |
|---|---|---|---|---|
| Copolymer II | | 10 | 5 | 0 |
| Viscosity, cp | | 182,000 | 6,600 | 98 |
| Conversion (Prepoly.) % w | | 30.5 | 29.0 | 32.5 |
| Dispersed Phase | | | | |
| Diene, % w | | 7.1 | 7.0 | 6.8 |
| Gel, % w | | 20.1 | 24.2 | — |
| Swell index | | 9.5 | 12.0 | — |
| Toughness (Compression Molded) | | | | |
| Izod (Notched) ft-lb/in | | 1.26 | 1.26 | 0.37 |
| Izod (Unnotched) ft-lb/in | | 8.9 | 6.8 | 2.4 |
| Gardner, ft-lb/in | | 16.7 | 18.5 | 7.0 |
| Toughness Index | | 9.4 | 8.9 | 3.0 |

ILLUSTRATIVE EMBODIMENT III

Illustrative Embodiment III is similar to Illustrative Embodiment II except that an SBS block copolymer of lower molecular weight (71,000–317,000–71,000) was employed. The results, presented below in Table 3, reveal that a substantial increase in toughness, as measured by the Gardner falling dart test, was achieved in the product obtained from the interpolymerization of the mixture of the two block polymers.

TABLE 3

Interpolymers with Mixtures of High and Low Molecular Weight Triblock Polymers

| Block Copolymer I | $S/B/S \times 10^{-3}$ | 16/69/16 | | |
| Block Copolymer III | $S/B/S \times 10^{-3}$ | 71/317/71 | | |
| Run No. | | B164 | B91 | B129 |
|---|---|---|---|---|
| Percent by weight Block Copolymer I | | 0 | 5 | 10 |
| Percent by weight Block Copolymer II | | 10 | 5 | 0 |
| Viscosity, cp | | 6950 | 934 | 98 |
| Conversion (Prepoly.) % w | | 35.1 | 32.5 | 32.5 |
| Dispersed Phase | | | | |
| Diene, % w | | 6.7 | 7.3 | 6.8 |
| Gel, % w | | 20.4 | 27.6 | — |
| Swell Index | | 11.3 | 13.4 | — |
| Toughness, (Compression Molded) | | | | |
| Izod (Notched), ft-lb/in | | 1.30 | 1.24 | 0.37 |
| Izod (Unnotched), ft-lb/in | | 8.9 | 8.2 | 2.4 |
| Gardner, ft-lb/in | | 14.7 | 32.7 | 7.0 |
| Toughness Index | | 9.3 | 11.2 | 3.0 |

ILLUSTRATIVE EMBODIMENT IV

Illustrative Embodiment IV also is similar to Illustrative Embodiment II except that an SBS block copolymer having a number average molecular weight distribution of 45,000–190,000–45,000 was used. The polymers from this embodiment were not particularly tough. Note that the product made from the mixed block polymers is not nearly as tough as that made from the mixed block polymers in Embodiment III. The results are presented below in Table 4.

TABLE 4

Interpolymers with Mixtures of High and Low Molecular Weight Triblock Polymers

| Block Copolymer I | $S/B/S \times 10^{-3}$ | 16/69/16 | | |
| Block Copolymer II | $S/B/S \times 10^{-3}$ | 45/190/45 | | |
| Run No. | | B172 | B93 | B129 |
|---|---|---|---|---|
| Percent by weight Block Copolymer I | | 0 | 5 | 10 |

TABLE 5

Interpolymers with Mixtures of High and Low Molecular Weight Triblock Polymers

| | Tapered Copolymer I  $S'/B'/S' \times 10^{-3}$ | | 67/342/67 | | |
|---|---|---|---|---|---|
| | Block Copolymer I  $S/B/S \times 10^{-3}$ | | 16/69/16 | | |
| Run No. | 13104 | 1313 | 1315 | 1317 | 13129 |
| Percent Block Copolymer I | 0 | 2.5 | 5.0 | 7.5 | 10.0 |
| Percent Tapered Copolymer I | 10 | 7.5 | 5.0 | 2.5 | 0 |
| Viscosity, cp | 5830 | 2675 | 1000 | 350 | 98 |
| Conversion (Prepoly.) % w | 31.1 | 32.0 | 31.8 | 32.4 | 32.5 |
| Dispersed Phase | | | | | |
| Diene, % w | 6.5 | 6.5 | 6.6 | 7.0 | 6.8 |
| Gel, % w | 18.7 | 21.6 | 24.6 | 15.5 | — |
| Swell Index | 13.8 | 15.2 | 15.6 | 17.3 | — |
| Toughness (Comparison Molded) | | | | | |
| Izod (Notched) ft-lb/in | 1.33 | 1.39 | 1.41 | 1.41 | 0.37 |
| Izod (Unnotched) ft-lb/in | 5.2 | 12.4 | 14.4 | 9.4 | 2.4 |
| Gardner, ft-lb/in | 32.2 | 36.1 | 52.9 | 38.6 | 7.0 |
| Toughness Index | 10.5 | 13.6 | 16.6 | 13.0 | 3.0 |

TABLE 4-continued

Interpolymers with Mixtures of High and Low Molecular Weight Triblock Polymers

| | Block Copolymer I  $S/B/S \times 10^{-3}$ | 16/69/16 | | |
|---|---|---|---|---|
| | Block Copolymer II  $S/B/S \times 10^{-3}$ | 45/190/45 | | |
| Run No. | | B172 | B93 | B129 |
| Percent by weight Block Copolymer III | | 8.84 | 5 | 0 |
| Viscosity, cp | | 788 | 386 | 98 |
| Conversion (Prepoly.) % w | | 29.3 | 34.6 | 32.5 |
| Dispersed Phase | | | | |
| Diene, % w | | 5.6 | 6.6 | 6.8 |
| Gel, % w | | 15.7 | 21.6 | — |
| Swell Index | | 13.4 | 14.5 | — |
| Toughness (Compression Molded) | | | | |
| Izod (Notched) ft-lb/in | | 1.32 | 0.96 | 0.37 |
| Izod (Unnotched) ft-lb/in | | 6.9 | 3.2 | 2.4 |
| Gardner, ft-lb/in | | 19.5 | 14.9 | 7.0 |
| Toughness Index | | 9.3 | 6.3 | 3.0 |

ILLUSTRATIVE EMBODIMENT V

In Illustrative Embodiment V, the process according to the claimed invention is employed to prepare polymers having a significantly improved impact resistance. The rubber component employed herein is Block Copolymer I and a tapered S'B'S' copolymer having a number average molecular weight distribution of about 67,000–342,000–67,000. The results are presented in Table 5. From the results of this embodiment and Illustrative Embodiment III it is apparent that the polystyrene block lengths of the higher molecular weight triblock polymer (A'B'A') should be on the order of 70,000. Comparison of the results of this embodiment with those of Embodiment III further show that a "tapered" structure of the A'B'A' block copolymer yields tougher products than a pure triblock copolymer.

The dispersed phase microstructure of the product from this embodiment consisted of a particulate polybutadiene phase in which were contained still smaller particles of polystyrene. Normal high impact polystyrene also consists of such a structure with the particles and subparticles generally being spherical or nearly spherical in shape. In contrast the subparticles of polystyrene in the dispersed phase particles of the preferred products of this embodiment are closely packed polygons similar to the cells found in foams. These larger particles of disperse phase which contain the subparticles tend to be irregular in shape rather than spherical.

What is claimed is:

1. A graft copolymer composition having improved toughness consisting essentially of:
   (a) from about 8.0 to about 16.0 parts by weight of a mixture of an ABA block copolymer and an A'B'A' tapered block copolymer in a weight ratio of the ABA copolymer to the A'B'A' copolymer of between about 25:75 and about 75:25 where each A segment is an essentially pure polymer block of styrene having a number average molecular weight of between about 14,000 and about 18,000, the B segment is an essentially pure polymer block of butadiene having a number average molecular weight of between about 60,000 and about 80,000, the B block having a glass transition temperature of about $-105°$ C. $\pm 5°$ C., the weight ratio of total A to B being between about 1:1.8 and about 1:2.7, and wherein each A' segment represents essentially polymerized styrene, the balance of the A' segment being polymerized butadiene, the B' segment represents essentially polymerized butadiene, the balance of the B' segment being polymerized styrene, the weight ratio of total A' to B' being from about 1:2.6 to about 1:3.6, the number average molecular weight of said A'B'A' block copolymers being between about 400,000 and about 660,000, and said B' block having a glass transition temperature of about $-90°$ C. $\pm 5°$ C.: and
   (b) from about 92.0 to about 84.0 parts by weight of monomeric styrene polymerized in the presence of said ABA and said A'B'A' copolymers.

2. The composition of claim 1 wherein the number average molecular weight of the A block is between about 15,000 and about 17,000.

3. The composition of claim 2 wherein the number average molecular weight of the B block is between about 65,000 and about 75,000.

4. The composition of claim 1 wherein the number average molecular weight of the A'B'A' tapered copolymer is between about 400,000 and about 500,000.

5. The composition of claim 1 wherein the relative amount of B' monomer in the A' block is about 20 weight percent and wherein the relative amount of A' monomer in the B' block is about 20 weight percent.

6. The composition of claim 1 wherein the morphology consists of polygon-shaped subparticles of polystyrene in a dispersed particulate polybutadiene phase.

7. In the process for preparing an impact modified poly(vinyl aromatic) composition comprising bulk thermal polymerizing of from about 2 to about 25 parts of rubber dissolved in about 98 to about 75 parts of a feed in which the sole polymerizable monomer component consists essentially of one or more monovinyl aromatic compounds at a temperature in the range from about 90° to about 200° C., with agitation until the reaction mixture has undergone phase inversion, for a time sufficient to polymerize substantially all of the monovinyl aromatic compound and removing residual monomers to form an interpolymer containing discrete gelled rubber particles, which improvement comprises using as the rubber a mixture of ABA block copolymer and A'B'A' tapered block copolymer in a weight ratio of the ABA copolymer to the A'B'A' copolymer of between about 25:75 and 75:25 where each A segment is an essentially pure polymer block of styrene having a number average molecular weight of between about 14,000 and about 18,000, the B segment is an essentially pure polymer block of butadiene having a number average molecular weight of between about 60,000 and about 80,000, the B block having a glass transition temperature of about $-105°$ C.$\pm 5°$ C., the weight ratio of total A to B being between about 1:1.8 and about 1:2.7, and wherein each A' segment represents essentially polymerized styrene, the balance of the A' segment being polymerized butadiene, the B' segment represents essentially polymerized butadiene, the balance of the B' segment being polymerized styrene, the weight ratio of total A' to B' being from about 1:2.6 to about 1:3.6, the number average molecular weight of said A'B'A' block copolymers being between about 400,000 and about 660,000, and said B' block having a glass transition temperature of about $-90°$ C.$\pm 5°$ C.

8. The process of claim 7 wherein the number average molecular weight of the A block is between about 15,000 and about 17,000.

9. The process of claim 8 wherein the number average molecular weight of the B block is between about 65,000 and about 75,000.

10. The process of claim 7 wherein the number average molecular weight of the A'B'A' tapered copolymer is between about 400,000 and about 500,000.

11. The process of claim 7 wherein the relative amount of B' monomer in the A' block is about 20 weight percent and wherein the relative amount of A' monomer in the B' block is about 20 weight percent.

12. The process of claim 7 wherein the morphology consists of polygon-shaped subparticles of polystyrene in a dispersed particulate polybutadiene phase.

* * * * *